US007876248B2

(12) United States Patent
Berkley et al.

(10) Patent No.: US 7,876,248 B2
(45) Date of Patent: Jan. 25, 2011

(54) SYSTEMS, METHODS AND APPARATUS FOR LOCAL PROGRAMMING OF QUANTUM PROCESSOR ELEMENTS

(75) Inventors: Andrew J. Berkley, Vancouver (CA); Paul I. Bunyk, Vancouver (CA); Geordie Rose, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 705 days.

(21) Appl. No.: 11/950,276

(22) Filed: Dec. 4, 2007

(65) Prior Publication Data

US 2008/0215850 A1 Sep. 4, 2008

Related U.S. Application Data

(60) Provisional application No. 60/868,654, filed on Dec. 5, 2006.

(51) Int. Cl.
*H03M 1/00* (2006.01)
(52) U.S. Cl. .................................. 341/133; 385/123
(58) Field of Classification Search ................ 341/133; 385/123, 125, 141, 142, 143; 365/160, 161, 365/162
See application file for complete search history.

(56) References Cited

U.S. PATENT DOCUMENTS

| | | | |
|---|---|---|---|
| 4,496,854 A | 1/1985 | Chi et al. .................. 307/306 |
| 4,937,525 A | 6/1990 | Daalmans .................. 324/248 |
| 5,128,675 A | 7/1992 | Harada .................. 341/133 |
| 5,162,731 A | 11/1992 | Fujimaki | |
| 5,629,889 A * | 5/1997 | Chandra et al. ............. 365/162 |
| 5,812,078 A * | 9/1998 | Przybysz et al. ............ 341/133 |
| 6,627,916 B2 | 9/2003 | Amin et al. .................. 257/31 |
| 6,838,694 B2 | 1/2005 | Esteve et al. .................. 257/34 |
| 6,978,070 B1 * | 12/2005 | McCarthy et al. ............ 385/123 |
| 7,133,888 B2 | 11/2006 | Kohn et al. ................. 708/446 |
| 7,335,909 B2 | 2/2008 | Amin et al. ................... 257/34 |
| 2003/0071258 A1 | 4/2003 | Zagoskin et al. .............. 257/31 |
| 2003/0224753 A1 | 12/2003 | Bremond et al. ............ 455/339 |
| 2005/0082519 A1 | 4/2005 | Amin et al. .................. 257/13 |
| 2005/0250651 A1 | 11/2005 | Amin et al. ................. 505/846 |
| 2005/0256007 A1 | 11/2005 | Amin et al. ................. 505/170 |
| 2006/0147154 A1 | 7/2006 | Thom et al. .................... 385/37 |
| 2006/0225165 A1 | 10/2006 | Maassen van den Brink et al. .......................... 977/933 |

FOREIGN PATENT DOCUMENTS

CA 2386426 A1 10/2000

OTHER PUBLICATIONS

U.S. Appl. No. 60/917,884, filed May 14, 2007, Berkley et al.
U.S. Appl. No. 60/975,083, filed Sep. 25, 2007, Amin.
U.S. Appl. No. 60/975,487, filed Sep. 26, 2007, Maibaum et al.

(Continued)

*Primary Examiner*—Joseph Lauture
(74) *Attorney, Agent, or Firm*—Seed IP Law Group PLLC

(57) ABSTRACT

Systems, methods and apparatus for a scalable quantum processor architecture. A quantum processor is locally programmable by providing a memory register with a signal embodying device control parameter(s), converting the signal to an analog signal; and administering the analog signal to one or more programmable devices.

34 Claims, 4 Drawing Sheets

OTHER PUBLICATIONS

U.S. Appl. No. 60/986,554, filed Nov. 8, 2007, Choi.
U.S. Appl. No. 12/013,192, filed Jan. 11, 2008, Rose et al.
U.S. Appl. No. 12/017,995, filed Jan. 22, 2008, Harris.
U.S. Appl. No. 12/120,354, filed May 14, 2008, Bunyk et al.
U.S. Appl. No. 61/039,710, filed Mar. 25, 2008, Maibaum et al.
U.S. Appl. No. 12/109,847, filed Apr. 25, 2008, Berkley.
"A High-Level Look at Optimization: Past, Present and Future," e-Optimization.Community, May 2000, pp. 1-5.
Allen et al., "Blue Gene: A vision for protein science using a petaflop supercomputer," *IBM Systems Journal* 40(2): 310-327, 2001.
Amin et al., "Thermally assisted adiabatic quantum computation," arXiv:cond-mat/0609332v2, pp. 1-5, Mar. 2, 2007.
Averin et al., "Variable Electrostatic Transformer: Controllable Coupling of Two Charge Qubits," *Physical Review Letters* 91(5): 057003-1-057003-4, Aug. 1, 2003.
Blatter et al., "Design aspects of superconducting-phase quantum bits," *Physical Review B* 63: 174511-1-174511-9, 2001.
Bocko et al., "Prospects for Quantum Coherent Computation Using Superconducting Electronics," *IEEE Transactions on Applied Superconductivity* 7(2): 3638-3641, Jun. 1997.
Brennen et al., "Why should anyone care about computing with anyons?," arXiv:0704.2241v1[quant-ph], pp. 1-12, Apr. 18, 2007.
Butcher, "Advances in persistent-current qubit research: Inductively coupled qubits and novel biasing methods," Final Report, Delft University of Technology, Faculty of Applied Sciences, pp. 1-50, Jan. 10, 2002.
Choudhury, *Handbook of Microlithography, Micromachining and Microfabrication vol. 1: Microlithography*, The International Society for Optical Engineering, Bellingham, WA, 1999.
Clarke et al., "Quiet Readout of Superconducting Flux States," *Physica Scripta. T* 102: 173-177, 2002.
Cosmelli et al., "Controllable Flux Coupling for the Integration of Flux Qubits," arXiv:cond-mat/0403690v1, pp. 1-10, Mar. 29, 2004.
Deutsch, "Quantum theory, the Church-Turing principle and the universal quantum computer," Appeared in *Proceedings of the Royal Society of London A* 400: 97-117, 1985.
Dolan et al., "Optimization on the NEOS Server," from *SIAM News* 35(6): Jul./Aug. 1-5, 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," *International Journal of Theoretical Physics* 21(6/7): 467-488, 1982.
Filippov et al., "Tunable Transformer for Qubits Based on Flux States," *IEEE Transactions on Applied Superconductivity* 13(2): Jun. 1-4, 2003.
Fourer et al., "Optimization as an Internet Resource," *INTERFACES* 31(2): 130-150, Mar.-Apr. 2001.
Friedman et al., "Quantum superposition of distinct macroscopic states," *Nature* 406: 43-46, Jul. 6, 2000.
Fritzsch et al., SNS and SIS Josephson junctions with dimensions down to the sub-µm region prepared by an unified technology, *Supercond. Sci. Tech.* 12: 880-882, 1999.
Ghiu et al., "Asymmetric two-output quantum processor in any dimension," arXiv:quant-ph/0610138v1, pp. 1-8, Oct. 17, 2006.
Harris et al., "Sign and Magnitude Tunable Coupler for Superconducting Flux Qubits," *DWAVE/COUPLER-10*, arXiv:cond-mat/0608253 v1, Aug. 11, 2006.
Hillery et al., "Approximate programmable quantum processors," arXiv:quant-ph/0510161v1, pp. 1-7, Oct. 20, 2005.
Hioe and Goto, *Quantum Flux Parametron—A Single Quantum Flux Superconducting Logic Device*, World Scientific Publishing Co. Pte. Ltd., Singapore, pp. 23-43, 1991.

Il'ichev et al., "Continuous Monitoring of Rabi Oscillations in a Josephson Flux Qubit," *Physical Review Letters* 91(9): 097906-1-097906-4, week ending Aug. 29, 2003.
Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.
Koch et al., "Model for 1/f Flux Noise in SQUIDs and Qubits," pp. 1-14, May 5, 2007.
Levinson, *Principles of Lithography*, The International Society for Optical Engineering, Bellingham, WA, 2001.
Levitov et al., "Quantum spin chains and Majorana states in arrays of coupled qubits," arXiv:cond-mat/0108266v2, pp. 1-7, Aug. 19, 2001.
Maassen van den Brink et al., "Mediated tunable coupling of flux qubits," *New Journal of Physics* 7: 1-18, 2005.
Madou, *Fundamentals of Microfabrication*, Second Edition, CRC Press LLC, Boca Raton, Florida, 2002.
Makhlin et al., "Quantum-state engineering with Josephson-junction devices," *Reviews of Modern Physics* 73(2): 357-400, Apr. 2001.
Mc Hugh et al., "A quantum computer using a trapped-ion spin molecule and microwave radiation," arXiv:quant-ph/0310015v2, pp. 1-9, Apr. 13, 2004.
Mooij et al., "Josephson Persistent-Current Qubit," *Science* 285: 1036-1039, Aug. 13, 1999.
Nielsen, "Cluster-State Quantum Computation," arXiv:quant-ph/0504097v2, pp. 1-15, Jul. 1, 2005.
Nielsen et al., *Quantum Computation and Quantum Information*, Cambridge University Press, Cambridge, 2000, Chapter 7, "Quantum computers: physical realization," pp. 277-352.
Nielsen et al., *Quantum Computation and Quantum Information*, Cambridge University Press, Cambridge, 2000, "7.8 Other implementation schemes," pp. 343-345.
Orlando et al., "Superconducting persistent-current qubit," *Physical Review B* 60(22): 15 398-15 413, Dec. 1, 1999.
Plourde et al., "Entangling flux qubits with a bipolar dynamic inductance," *Physical Review B* 70(140501-R): 1-4, 2004.
Ryan et al., "Characterization of complex quantum dynamics with a scalable NMR information processor," arXiv:quant-ph/0506085v2, pp. 1-4, Feb. 13, 2006.
Shirts et al., "Computing: Screen Savers of the Word Unite!," *Science Online* 290(5498): 1903-1904, Dec. 8, 2000.
Shnirman et al., "Quantum Manipulations of Small Josephson Junctions," *Physical Review Letters* 79(12): 2371-2374, Sep. 22, 1997.
Shoji et al., "New fabrication process for Josephson tunnel junctions with (niobium nitride, niobium) double-layered electrodes," *Appl. Phys. Lett.* 41(11): 1097-1099, Dec. 1, 1982.
Shor, "Introduction to Quantum Algorithms," AT&T Labs—Research, arXiv:quant-ph/0005003 v2, pp. 1-17, Jul. 6, 2001.
Thaker et al., "Quantum Memory Hierarchies: Efficient Designs to Match Available Parallelism in Quantum Computing," arXiv:quant-ph/0604070v1, 12 pages, Apr. 10, 2006.
Van Zant, *Microchip Fabrication*, Fourth Edition, McGraw-Hill, New York, 2000.
Vlasov, "Von Neumann Quantum Processors," arXiv:quant-ph/0311196v1, pp. 1-8, Nov. 27, 2003.
Williams et al., *Explorations in Quantum Computing*, Springer, New York, Dec. 12, 1997, Chapter 11, "How to Make a Quantum Computer," pp. 241-265.
International Search Report, mailed Mar. 18, 2008, for PCT/CA2007/002192, 4 pages.
Written Opinion, mailed Mar. 18, 2008, for PCT/CA2007/002192, 5 pages.

\* cited by examiner

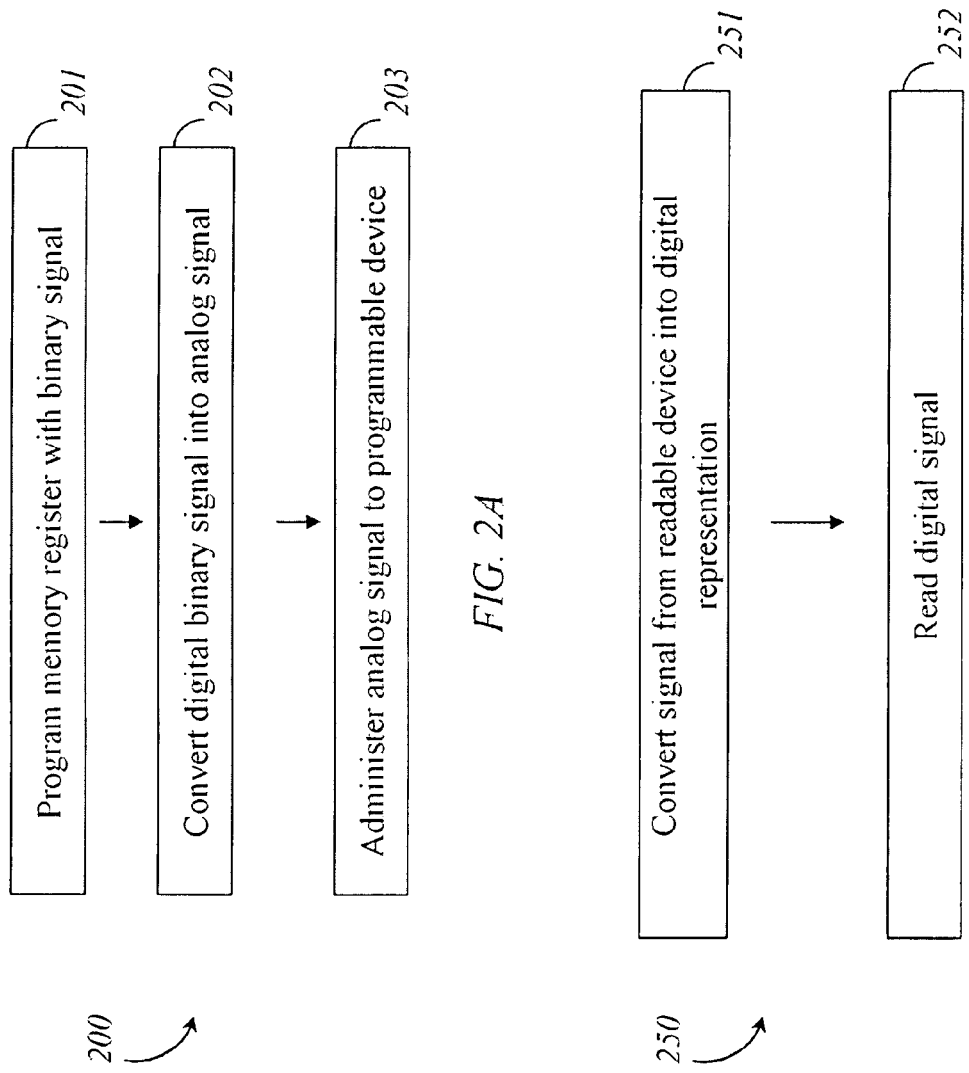

SYSTEMS, METHODS AND APPARATUS FOR LOCAL PROGRAMMING OF QUANTUM PROCESSOR ELEMENTS

CROSS REFERENCE TO RELATED APPLICATIONS

This application claims benefit under 35 U.S.C. 119(e) to U.S. provisional patent application Ser. No. 60/868,654, filed Dec. 5, 2006, which is incorporated herein by reference in its entirety.

BACKGROUND

1. Field

The present systems, methods and apparatus relate to scalable quantum computing and the local programming of quantum processor elements.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation comprises using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Embodiments of Quantum Computers

A quantum computer is any computing device that makes direct use of quantum mechanical phenomena, such as superposition and entanglement, to solve computational problems. To date, many different systems have been proposed and studied as physical realizations of quantum computers. Examples of such systems include the following devices: ion traps, quantum dots, harmonic oscillators, cavity quantum electrodynamics devices (QED), photons and nonlinear optical media, heteropolymers, cluster-states, anyons, topological systems, systems based on nuclear magnetic resonance (NMR), and systems based on spins in semiconductors. For further background on these systems, see Nielsen and Chuang, *Quantum Computation and Quantum Information*, Cambridge University Press, Cambridge (2000), pp. 277-352; Williams and Clearwater, *Explorations in Quantum Computing*, Springer-Verlag, New York, Inc. (1998), pp. 241-265; Nielsen, Micheal A., "Cluster-State Quantum Computation", arXiv.org:quant-ph/0504097v2 (2005), pp 1-15; and Brennen, Gavin K. et al., "Why should anyone care about computing with anyons?", arXiv.org:quant-ph/0704.2241 (2007), pp 1-19.

In brief, an example of an ion trap quantum computer is a computer structure that employs ions that are confined in free space using electromagnetic fields. Qubits may be represented by the stable electronic states of each ion. An example of a quantum dot quantum computer is a computer structure that employs electrons that have been confined to small regions where their energies can be quantized in such a way that each dot may be isolated from the other dots. An example of a harmonic oscillator is computer structure that employs a particle in a parabolic potential well. An example of an optical photon quantum computer is a computer structure in which qubits are represented by individual optical photons which may be manipulated using beam-splitters, polarization filters, phase shifters, and the like. An example of a cavity QED quantum computer is a computer structure that employs single atoms within optical cavities where the single atoms are coupled to a limited number of optical modes. An example of an NMR quantum computer is a computer structure in which qubits are encoded in the spin states of at least one of the nuclei in the atoms comprising a molecular sample. An example of a heteropolymer quantum computer is a computer structure that employs a linear array of atoms as memory cells, where the state of the atoms provides the basis for a binary arithmetic. An example of a quantum computer that uses electron spins in semiconductors is the Kane computer, in which donor atoms are embedded in a crystal lattice of, for example, silicon. An example of a topological quantum computer is a computer structure that employs two-dimensional "quasiparticles" called anyons whose world lines cross to form braids in a three-dimensional spacetime. These braids may then be used as the logic gates that make up the computer structure. Lastly, an example of a cluster-state quantum computer is a computer structure that employs a plurality of qubits that have been entangled into one quantum state, referred to as a cluster-state. "Cluster-state" generally refers to a particular quantum computing method, and those of skill in the art will appreciate that the present systems, methods and apparatus may incorporate all forms of quantum computing, including the various hardware implementations and algorithmic approaches. Those of skill in the art will also appreciate that the descriptions of various embodiments of quantum computers provided herein are intended only as examples of some different physical realizations of quantum computation. The present systems, methods and apparatus are in no way limited by or to these descriptions. Those of skill in the art will also appreciate that a quantum processor may be embodied in a system other than those described above.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle=a|0\rangle+b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

One hardware approach to quantum computation uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and US Patent Application No. 2005-0082519.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, *Science* 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. DC-SQUID magnetometers typically include a loop of superconducting material interrupted by at least one Josephson junction.

Superconducting Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary superconducting quantum processors that may be used in conjunction with the present systems, methods, and apparatus are described in US Patent Publication No. 2006-0225165; U.S. Provisional Patent Application Ser. No. 60/872,414, filed Jan. 12, 2007, entitled "System, Devices and Methods for Interconnected Processor Topology"; U.S. Provisional Patent Application Ser. No. 60/956,104, filed Aug. 16, 2007, entitled "Systems, Devices, And Methods For Interconnected Processor Topology"; and U.S. Provisional Patent Application Ser. No. 60/986,554, filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in U.S. Patent Publication Number 2006-0147154 and U.S. Provisional Patent Application Ser. No. 60/886,253 filed Jan. 23, 2007 and entitled "Systems, Devices, and Methods for Controllably Coupling Qubits". Respective coupling strengths of the coupling devices may be tuned between zero and a maximum value, for example, to provide ferromagnetic or anti-ferromagnetic coupling between qubits.

Regardless of the specific hardware being implemented, managing a single qubit may require control over a number of parameters. Conventionally, this requirement has necessitated outside communication (that is, communication from outside of the quantum processor architecture) with each individual qubit. However, the overall processing power of the quantum computer increases with the number of qubits in the system. Therefore, high capacity quantum computers that exceed the abilities of conventional supercomputers must manage a large number of qubits and thus the conventional approach of employing outside control over multiple parameters on each individual qubit requires a complicated system for programming qubit parameters.

Thus, the scalability of quantum processors is limited by the complexity of the qubit parameter control system and there remains a need in the art for a scalable qubit parameter control system.

BRIEF SUMMARY

At least one embodiment may be summarized as a quantum processor including a plurality of programmable devices, wherein each programmable device is connected to at least one communication conduit; and a memory administration system, wherein the memory administration system is linked to at least one programmable device via at least one of the communication conduits.

At least one embodiment may be summarized as a method of programming a quantum processor comprising at least one programmable device, the method including locally programming at least one information storage device with a data signal embodying at least one programmable device control parameter; converting the data signal to an analog signal; and administering the analog signal to the programmable device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 2A and 2B are flow diagrams of embodiments of methods for respectively programming and reading quantum processor elements.

DETAILED DESCRIPTION

Figure 1A:
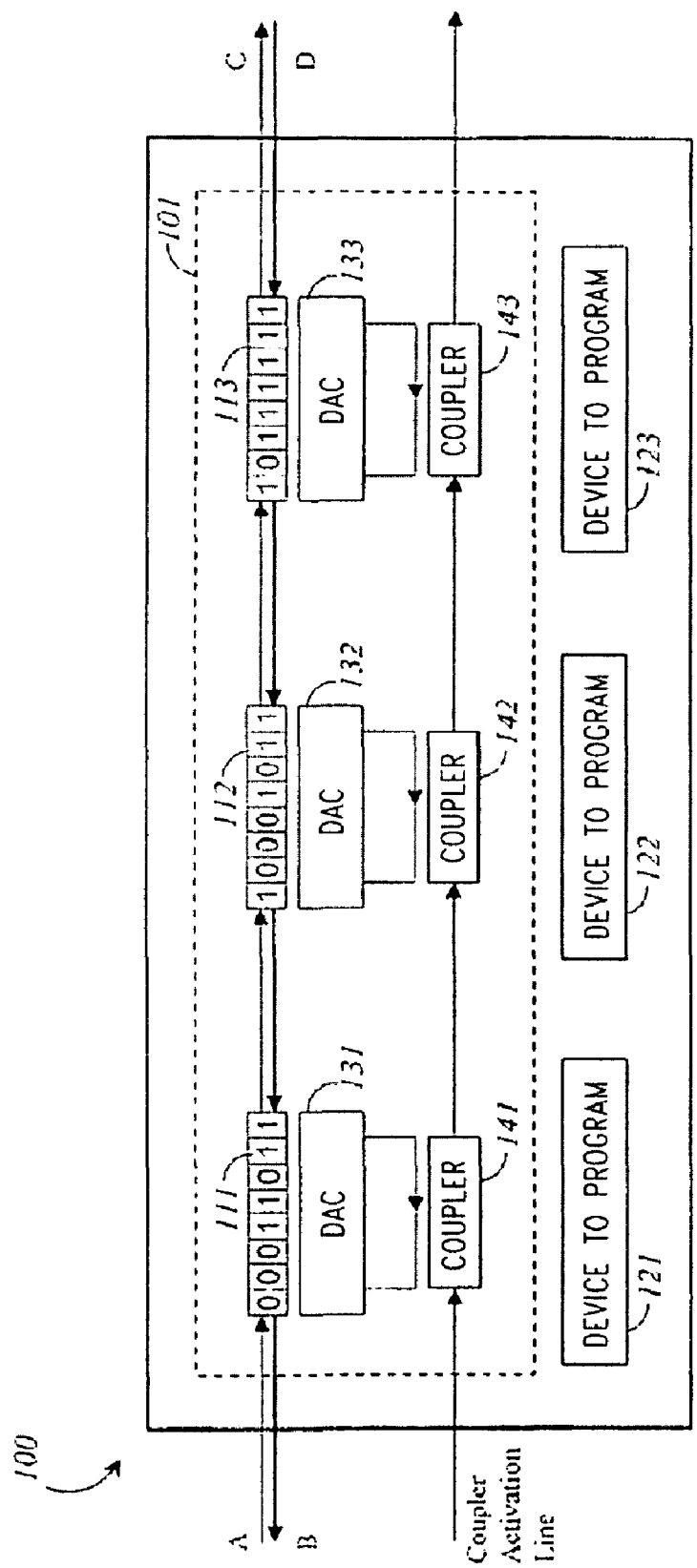
FIG. 1A is a schematic diagram of one embodiment of the local programming of quantum processor elements according to the present systems, methods and apparatus.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices and control systems, including microprocessors and drive circuitry, have not been shown or described in detail to avoid unnecessarily obscuring descriptions of the embodiments of the present systems, methods and apparatus. Throughout this specification, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment," "an embodiment" or "another embodiment" means that a particular referent feature, structure or characteristic described in connection with the embodiment is included in at least one embodiment. Thus, the appearances of the phrases "in one embodiment," "in an embodiment" or "another embodiment" in various places throughout this specification are not necessarily all referring to the same embodiment. Furthermore, the particular features, structures or characteristics may be combined in any suitable manner in one or more embodiments.

It should be noted that, as used in this specification and the appended claims, the singular forms "a," "an" and "the" include plural referents unless the content clearly dictates otherwise. Thus, for example, reference to "a quantum processor" includes a single quantum processor or two or more quantum processors. It should also be noted that the term "or" is generally employed in its sense including "and/or" unless the content clearly dictates otherwise.

Furthermore, it should be noted that while a portion of this specification and the appended claims describes the application of this disclosure in a quantum processor comprising superconducting flux qubits, those of skill in the art will appreciate that the methods described herein may easily be adapted to apply to other forms of quantum processors.

The headings provided herein are for convenience only and do not interpret the scope or meaning of the embodiments.

In accordance with the present systems, methods and apparatus, a scalable technique for quantum computing involving local programming of quantum processor elements is described. Throughout this specification and the appended claims, the term "quantum processor" is used to describe a system that comprises at least two qubits and at least one device, such as a qubit coupler, for communicating information between at least two qubits. Some embodiments of a quantum processor may include tens, hundreds, thousands, or even millions of qubits and qubit couplers. In some embodiments, the components of a quantum processor may be entirely contained within a single structure, such as a superconducting quantum processor chip. In other embodiments, the components of a quantum processor may be distributed over a plurality of structures with a means for communicating information therebetween.

FIG. 1A shows an exemplary quantum processor 100 which includes memory administration system 101 and three programmable devices 121, 122, 123. Throughout this specification and the appended claims, the terms "programmable device" and "programmable devices" are used to describe any of a variety of components in a quantum processor for which programming is desired. Examples of programmable devices include qubits, qubit couplers, specific components of qubits and qubit couplers, and the like. For example, a superconducting flux qubit may include two components: a closed superconducting current path and a compound Josephson junction, and separate data signals may be programmed into both of these components individually.

Those of skill in the art will appreciate that quantum processor 100 may be scaled to include any number of devices by simply scaling the devices shown in FIG. 1A accordingly. Furthermore, although FIG. 1A shows quantum processor 100 as one physical structure, the components of quantum processor 100 may be divided into a plurality of separate physical units that are communicably connected by a system of communication conduits. For example, quantum processor 100 may include a plurality of distinct processor chips, or a multi-chip module, wherein spatially separated components may be communicably connected by a system of communication conduits. Reference throughout this specification and the appended claims to a "communication conduit" or a plurality of "communication conduits" encompasses all means of signal transfer, including but not limited to electrical wires, conductive traces, magnetic (inductive) coupling, capacitive coupling, fiber-optics, and the like.

In FIG. 1A, memory administration system 101 comprises a string of memory registers 111, 112, 113 which are used to administer signals representative of data, such as N-bit digital signals, to each programmable device 121-123 in quantum processor 100. Those of skill in the art will appreciate that the terms "administer", "administering", "administration" and the like are used herein to encompass, but are not limited to, all manner of generating, managing, storing, operating upon and transferring the data signals. The N-bit signals may be programmed to represent various parameters that influence the behavior of programmable devices 121-123. For illustration, 8-bit signals and serially connected 8-bit memory registers 111-113 are shown in FIG. 1A, but those of skill in the art will appreciate that signals of any bit length or resolution may be employed and that memory registers 111-113 may be connected in another manner or may not be connected at all, i.e., they may be connected in parallel, in an X-Y addressable array, through a demultiplexer circuit, in a network including at least one packet router, or they may each be independently controlled and each have their own individual communication lines A, B, C, D.

As shown in FIG. 1A, the data signals administered by memory registers 111-113 are digital signals, however those of skill in the art will appreciate that data signals of other forms may be employed. Before being applied to programmable devices 121-123, the digital signals may be converted into analog signals by digital-to-analog converters (DACs) 131, 132, 133. Each respective DAC 131-133 may receive the digital bits of an N-bit signal and use this N-bit digital signal to produce at least one analog signal which may then be administered to at least one of programmable devices 121-123. In some embodiments, such as that shown in FIG. 1A, this administration is accomplished via intermediate coupling devices 141, 142, 143. The intermediate coupling devices 141-143 may each be connected to a coupler activation line and be activated/deactivated by the coupler activation line. In some embodiments, intermediate coupling devices 141-143 may be connected in series to a single coupler activation line as illustrated in FIG. 1A. Thus, in such embodiments, a signal is only administered or applied from a DAC 131-133 to a programmable device 121-123 when a corresponding intermediate coupling device 141-143 is activated by the coupler activation line. For example, a signal may be administered from DAC 131 to programmable device 121 when intermediate coupling device 141 is activated by the coupler activation line. In some embodiments, a coupler activation line may be analog variable such that intermediate coupling devices 141-143 may provide controllable levels of partial coupling between DACs 131-133 and programmable devices 121-123. In some embodiments, a coupler activation line may only be ON/OFF controllable, such that intermediate coupling devices 141-143 may provide only controllable ON/OFF coupling between DACs 131-133 and programmable devices 121-123. Other embodiments of the present systems, methods and apparatus may omit the intermediate coupling devices 141-143 and instead signals may be coupled directly from DACs 131-133 to programmable devices 121-123.

By employing the present systems, methods and apparatus, at least a portion of the control communication may be contained within quantum processor 100 while external input includes the programming of the N-bit signals via communication lines A-D, and, in some embodiments, the control of intermediate coupling devices 141-143 via at least one coupler activation line. As such, the number of communication lines required to connect quantum processor 100 to an external system is greatly reduced and becomes essentially independent of the number of programmable devices in quantum processor 100.

One skilled in the art will recognize that a DAC may be applied to convert digital signals to analog, analog signals to digital, or to perform both operations simultaneously or interchangeably, depending on the signal direction. As such, the system described in FIG. 1A may also be operated in reverse, whereby signals from programmable devices 121-123 are coupled to DACs 131-133 via intermediate coupling devices 141-143. The signals may then be converted into digital representations which may be administered or applied to memory registers 111-113 and transmitted to an external reading system.

The present systems, methods and apparatus are not linked to a particular type of quantum processor and its associated programmable devices. Rather, the present systems, methods and apparatus may be applied to any form of quantum processor. In some embodiments, quantum processor 100 may be a superconducting quantum processor comprising a plurality of superconducting flux qubits coupled by a plurality of programmable qubit couplers, such as those described in US Patent Publication Nos. 2006-0225165 and 2006-0147154, and in Harris, R. et al., "Sign and Magnitude Tunable Coupler for Superconducting Flux Qubits", arXiv.org:cond-mat/0608253 (2006), pp 1-5. Since such qubits and their associated couplers are designed to manage flux signals, the N-bit signals from memory registers 111-113 may be administered in the form of discrete magnetic flux quanta. Memory registers 111-113 may then take the form of superconducting shift registers, such as single flux quantum (SFQ) shift registers or the flux-based superconducting shift registers described in U.S. Provisional Patent Application Ser. No. 60/913,980, filed Apr. 25, 2007, and entitled "Adiabatic Superconducting Qubit Logic Devices And Methods." In some embodiments, the superconducting shift registers may be serially linked as illustrated in FIG. 1A, or they may be connected in parallel, or they may be connected in an X-Y addressable array, or they may be connected to a routing system. The N-bit signal loaded into each register may be represented digitally by discrete magnetic flux quanta within the superconducting shift registers. Each of the superconducting shift registers 111-113 may be inductively or galvanically coupled to a respective superconducting DAC 131-133, where the digital magnetic flux quanta may be used to produce at least one analog supercurrent. Thus, in some embodiments a memory register, such as memory register 111 and a DAC, such as DAC 131, may be realized within the same physical structure. Examples of superconducting DACs are described in U.S. Provisional Patent Application Ser. No. 60/917,884, filed May 14, 2007, entitled "Scalable Superconducting Flux Digital-To-Analog Conversion Using A Superconducting Inductor Ladder Circuit"; U.S. Provisional Patent Application Ser. No. 60/917,891, filed May 14, 2007, entitled "Systems, Methods, And Apparatus For A Scalable Superconducting Flux Digital-To-Analog Converter"; and U.S. Provisional Patent Application Ser. No. 60/975,487, filed Sep. 26, 2007, and entitled "Systems, Methods and Apparatus for a Differential Superconducting Flux Digital-to-Analog Converter."

In some embodiments, the at least one analog supercurrent that is output by a DAC may be inductively coupled to at least one programmable device 121-123 via at least one intermediate coupling device 141-143 by activating the coupler activation line. In other embodiments, the at least one analog supercurrent may be inductively coupled directly to at least one of programmable devices 121-123. As previously described, in some embodiments the system may also be operated in reverse to produce digital output from the SFQ shift registers based on analog input from one or more programmable devices 121-123.

Figure 1B:
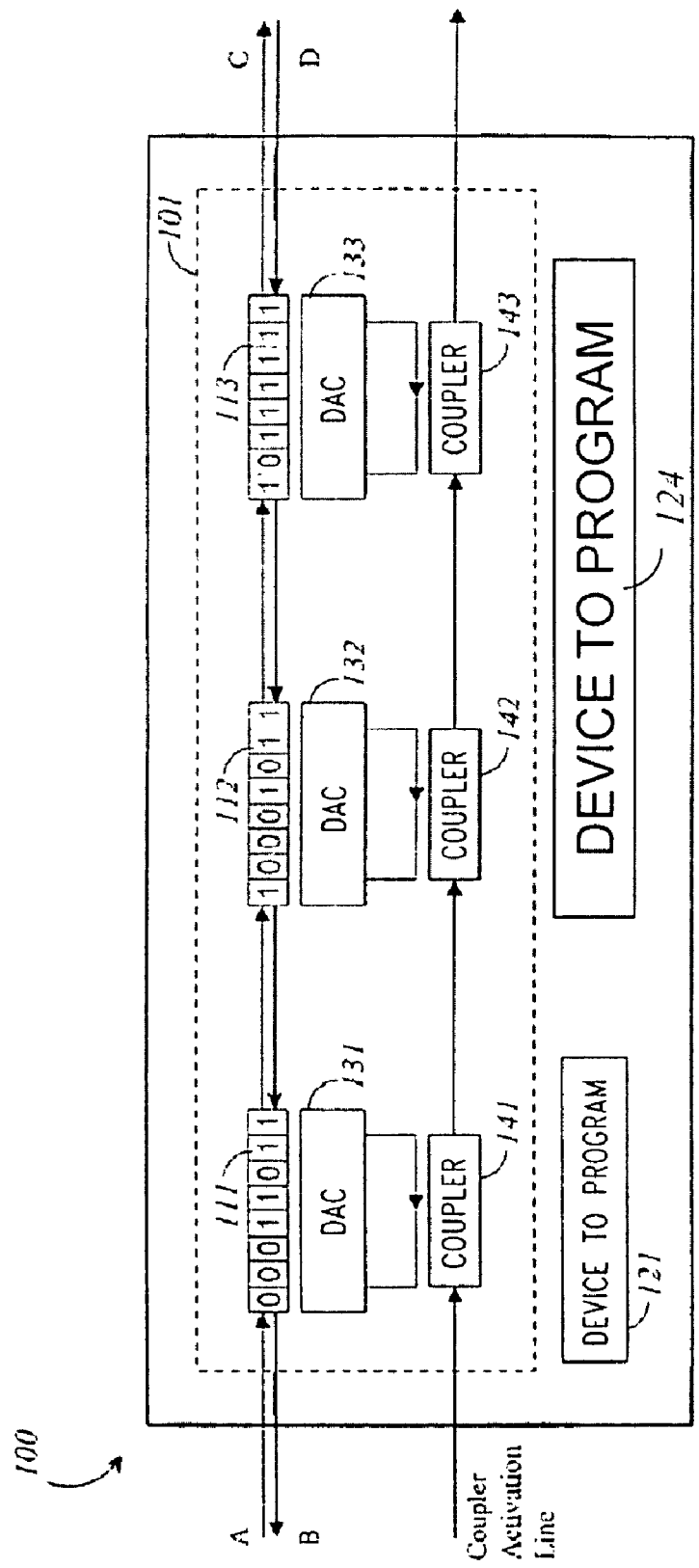
FIG. 1B is a schematic diagram of another embodiment of the local programming of quantum processor elements.

In some embodiments of the present systems, methods and apparatus, a plurality of DACs may be coupled to a single programmable device. FIG. 1B is a schematic diagram of such an embodiment for the local programming of quantum processor elements. The embodiment illustrated in FIG. 1B is similar to that illustrated in FIG. 1A, except that in FIG. 1B two DACs 132 and 133 are coupled to a single programmable device 124, while DACs 132 and 133 are also each coupled to a respective memory register 112 and 113. This coupling scheme can provide control over the rate at which programmable device 124 is programmed from an initial state X to a programmed state Y, effectively realizing an arbitrary waveform generator. In the embodiment shown in FIG. 1A, each programmable device 121-123 is coupled to a single DAC (131-133, respectively) and therefore each programmable device 121-123 is programmed at the same time and at the same rate. However, in the embodiment shown in FIG. 1B, programmable device 124 is coupled to two DACs 132 and 133 and this allows a degree of control over the time and rate at which programmable device 124 is programmed. Those of skill in the art will appreciate that while only one programmable device 124 is shown as being coupled to two DACs 132 and 133 in FIG. 1B, all or any number of the programmable devices in a quantum processor may be coupled to two or any number of DACs.

FIG. 2A is a flow diagram of a method 200 for programming the elements of a quantum processor (such as, for example, quantum processor 100 of FIG. 1A) according to an embodiment of the present systems, methods and apparatus. Those of skill in the art will appreciate that while FIG. 2A refers to all devices in singular form, method 200 may be applied over a plurality of devices. In act 201 of method 200, a binary signal is programmed or written to a memory register (such as one or more of memory registers 111-113 from FIG. 1A). In act 202, the binary signal is converted into a analog signal. In act 203, the analog signal is administered or applied to one or more programmable devices of the quantum processor, such as programmable devices 121-123 from FIG. 1A. Thus, acts 201 through 203 may all be completed within the dimensions of the quantum processor, thus reducing the need for communication with external programming systems.

FIG. 2B is a flow diagram of a method 250 for reading information from readable devices by essentially operating method 200 in reverse. Those of skill in the art will appreciate that while FIG. 2B refers to all devices in singular form, method 250 may be applied over a plurality of devices. In act 251, a signal is output by or read from the readable device and converted into a digital representation. In act 252, the digital representation of the signal is output to or read-out by another system. Again, acts 251 to 252 may be completed within the dimensions of the quantum processor, thus reducing the need for communication with external programming systems.

As previously discussed, a variety of coupling schemes may be implemented to program data storage devices, such as memory registers 111-113. For instance, memory registers 111-113 may be serially coupled to communication lines A-D as illustrated in FIGS. 1A and 1B. In other embodiments, memory registers 111-113 may be coupled in parallel to similar communication lines. In some embodiments of the present systems, methods and apparatus, the data storage devices may be programmed through a routing system; an example of such a routing system is a demultiplexer circuit.

Figure 3:
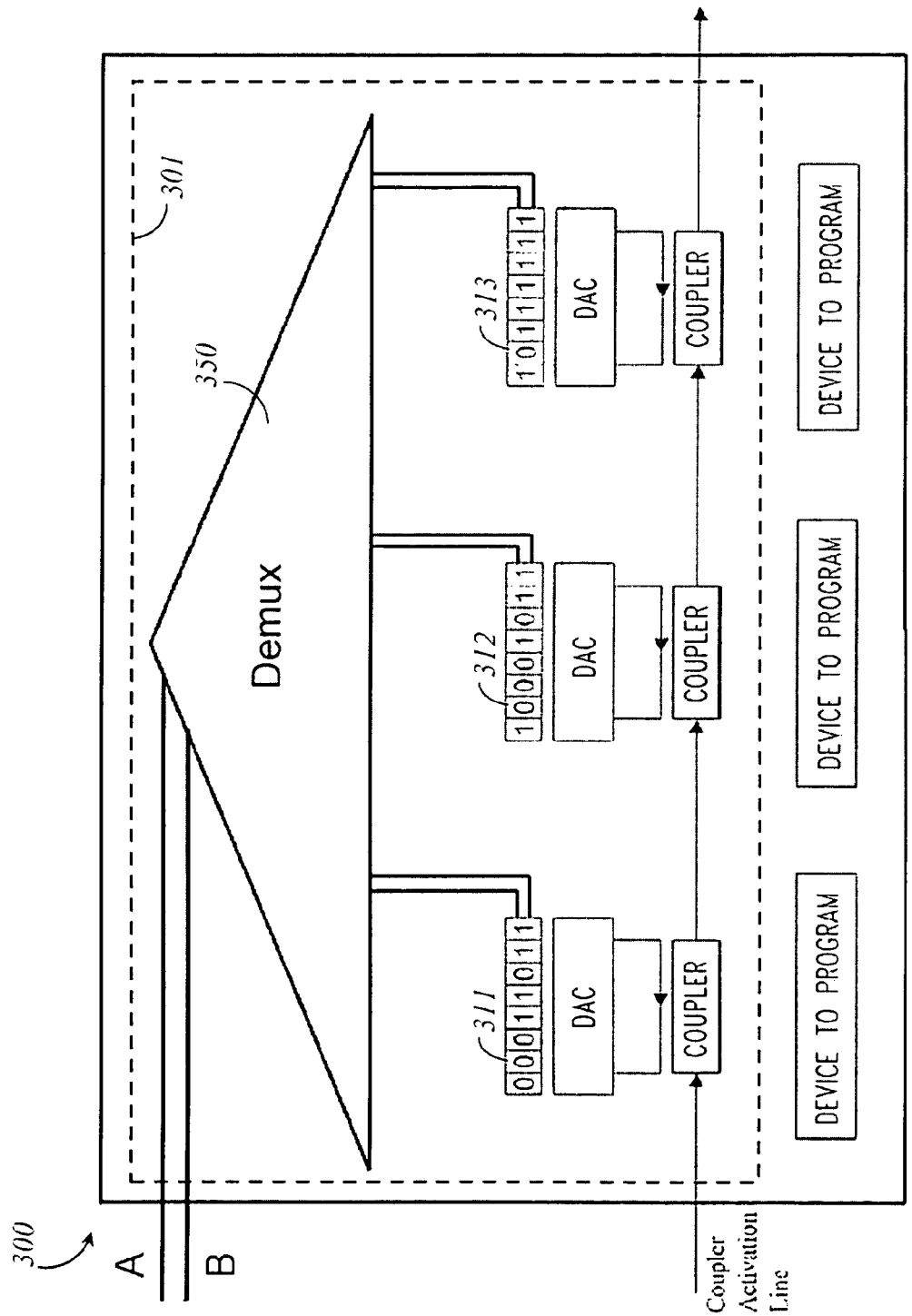
FIG. 3 is a schematic diagram of an embodiment of local programming of a quantum processor through a demultiplexer circuit.

FIG. 3 is a schematic diagram of an embodiment of local programming of a quantum processor 300 through a demultiplexer circuit 350. As illustrated in FIG. 3, quantum processor 300 includes memory administration system 301, which is similar to memory administration system 101 from FIG. 1A except that it includes a demultiplexer circuit 350 that may be used to rout signals to data storage devices 311-313. In operation, demultiplexer 350 may receive a signal through at least one of communication lines A and B and, through a sequence of internal routing procedures, direct the signal towards a specific output channel. The specific output channel may correspond to at least one of data storage devices 311-313. The general operation of a demultiplexer is understood in the art; as such, those of skill in the art will appreciate that demultiplexer 350 may include additional signal input lines. In some embodiments, demultiplexer 350 may include a plurality of routing devices arranged in logical rows to form a logical binary tree. Demultiplexer 350 may include additional signal input lines (not shown) such that each logical row of routing devices is controlled by a respective signal input line.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other quantum computing systems, methods and apparatus, not necessarily the exemplary quantum computing systems, methods and apparatus generally described above.

For instance, the foregoing detailed description has set forth various embodiments of the systems, methods and apparatus via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

The various embodiments described above can be combined to provide further embodiments.

All of the U.S. patents, U.S. patent application publications, U.S. patent applications, foreign patents, foreign patent applications and non-patent publications referred to in this specification including, but not limited to: U.S. Pat. No. 6,838,694; US Patent Publication No. 2005-0082519; US Patent Publication No. 2006-0225165; U.S. Provisional Patent Application Ser. No. 60/872,414, filed Jan. 12, 2007, entitled "System, Devices and Methods for Interconnected Processor Topology"; U.S. Provisional Patent Application Ser. No. 60/956,104, filed Aug. 16, 2007, entitled "Systems, Devices, And Methods For Interconnected Processor Topology"; U.S. Provisional Patent Application Ser. No. 60/986,554, filed Nov. 8, 2007, entitled "Systems, Devices and Methods for Analog Processing"; US Patent Publication No. 2006-0225165; US Patent Publication No. 2006-0147154; U.S. Provisional Patent Application Ser. No. 60/913,980, filed Apr. 25, 2007, and entitled "Adiabatic Superconducting Qubit Logic Devices And Methods"; U.S. Provisional Patent Application Ser. No. 60/917,884, filed May 14, 2007, entitled "Scalable Superconducting Flux Digital-To-Analog Conversion Using A Superconducting Inductor Ladder Circuit"; U.S. Provisional Patent Application Ser. No. 60/917,891, filed May 14, 2007, entitled "Systems, Methods, And Apparatus For A Scalable Superconducting Flux Digital-To-Analog Converter"; and U.S. Provisional Patent Application Ser. No. 60/975,487, filed Sep. 26, 2007, entitled "Systems, Methods and Apparatus for a Differential Superconducting Flux Digital-to-Analog Converter" are incorporated herein by reference, in their entirety and for all purposes. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the invention to the specific embodiments disclosed in the specification and the claims, but should be construed to include all possible embodiments along with the full scope of equivalents to which such claims are entitled. Accordingly, the scope of the invention shall only be construed and defined by the scope of the appended claims.

What is claimed is:

1. A quantum processor comprising:
a plurality of programmable devices including a plurality of qubits; and
a memory administration system including a plurality of communication conduits, wherein the memory administration system is configured to couple to at least one of the programmable devices via at least one of the communication conduits, and wherein the memory administration system includes at least one digital-to-analog converter (DAC).

2. The quantum processor of claim 1 wherein at least one programmable device and at least a portion of the memory administration system are formed by a material that is superconducting below a critical temperature.

3. The quantum processor of claim 1 wherein the programmable devices are selected from the group consisting of superconducting flux qubits, superconducting charge qubits, superconducting phase qubits, superconducting hybrid qubits, quantum dots, trapped ions, trapped neutral atoms, qubit couplers, superconducting qubit couplers, impurities, nuclear spin qubits, electronic spin qubits, and photonic qubits.

4. The quantum processor of claim 1 wherein at least one communication conduit is configured to communicably couple between two or more programmable devices.

5. The quantum processor of claim 1 wherein the memory administration system comprises a plurality of components and at least one communication conduit is configured to communicably couple between at least one programmable device and at least one component of the memory administration system.

6. The quantum processor of claim 1 wherein the memory administration system comprises a plurality of components and at least one communication conduit is configured to communicably couple between two or more components of the memory administration system.

7. The quantum processor of claim 1 wherein the DAC includes a superconducting flux DAC, and wherein digital signals are represented by discrete magnetic flux quanta.

8. The quantum processor of claim 1 wherein the memory administration system includes at least one memory register.

9. The quantum processor of claim 8 wherein at least two memory registers are configured to communicably couple in series with one another.

10. The quantum processor of claim 8 wherein at least one memory register is configured to administer digital signals to at least one DAC.

11. The quantum processor of claim 10 wherein at least one memory register is configured to administer digital signals to at least one DAC in the form of magnetic flux quanta.

12. The quantum processor of claim 10 wherein at least one memory register is configured to galvanically couple to at least one DAC.

13. The quantum processor of claim 10 wherein at least one memory register is configured to inductively couple to at least one DAC.

14. The quantum processor of claim 8 wherein the memory administration system includes a superconducting flux-based shift register.

15. The quantum processor of claim 14 wherein the superconducting flux-based shift register includes a single flux quantum (SFQ) shift register.

16. The quantum processor of claim 1 wherein the memory administration system includes a routing system.

17. The quantum processor of claim 16 wherein the routing system includes a demultiplexer circuit.

18. The quantum processor of claim 1 wherein at least one DAC is configured to administer at least one analog signal to at least one programmable device.

19. The quantum processor of claim 18 wherein the at least one DAC is configured to administer the at least one analog signals to the at least one programmable device via inductive coupling.

20. The quantum processor of claim 19 wherein the inductive coupling between the at least one DAC and the at least one programmable device is mediated by an intermediate coupling device.

21. The quantum processor of claim 20 wherein at least one intermediate coupling device is configured to inductively couple to both the at least one DAC and the at least one programmable device.

22. The quantum processor of claim 21 wherein the at least one intermediate coupling device is configured to communicably couple to an activation communication conduit and the at least one intermediate coupling device is capable of being switched between an active state and an inactive state via the activation communication conduit.

23. The quantum processor of claim 22 wherein at least two intermediate coupling devices are configured to communicably couple to the same activation communication conduit and each intermediate coupling device is capable of being switched between an active state and an inactive state by the activation communication conduit.

24. The quantum processor of claim 22 wherein the activation communication conduit is analog variable between the active state and the inactive state.

25. The quantum processor of claim 1 wherein at least two DACs are each configured to administer at least one respective analog signal to the same programmable device.

26. A method of programming a quantum processor, wherein the quantum processor includes a plurality of programmable devices and a memory administration system having at least one digital-to-analog converter (DAC), the method comprising:

using the memory administration system to program a first DAC with a first digital signal that embodies a control parameter for a first programmable device;
using the first DAC to convert the first digital signal to a first analog signal; and
administering the first analog signal to the first programmable device.

27. The method of claim 26 wherein using the first DAC to convert the first digital signal to a first analog signal includes generating a first analog signal having a magnitude proportional to the first digital signal.

28. The method of claim 27 wherein administering the first analog signal to the first programmable device includes administering the first analog signal to an intermediate coupling device.

29. The method of claim 28 wherein the intermediate coupling device is configurable to an active state and an inactive state and wherein the intermediate coupling device administers the first analog signal to the first programmable device when the intermediate coupling device is in the active state.

30. The method of claim 28 wherein the intermediate coupling device is tunable between an active state and an inactive state and wherein the intermediate coupling device administers at least a portion of the first analog signal to the first programmable device when the intermediate coupling device is tuned away from the inactive state.

31. The method of claim 26, further comprising:
using the memory administration system to program a second DAC with a second digital signal that embodies a control parameter for a second programmable device;
using the second DAC to convert the second digital signal to a second analog signal; and
administering the second analog signal to the second programmable device.

32. The method of claim 26 wherein the first and second DACs are respectively programmed in series with one another.

33. The method of claim 32 wherein the memory administration system includes a routing system and the first and second DACs are respectively programmed using the routing system.

34. The method of claim 33 wherein the routing system includes a demultiplexer circuit and the first and second DACs are respectively programmed using the demultiplexer circuit.

* * * * *